(12) United States Patent
Hill et al.

(10) Patent No.: US 10,267,407 B2
(45) Date of Patent: Apr. 23, 2019

(54) IN SITU GEARBOX GREASING SYSTEM

(71) Applicant: HAMILTON SUNDSTRAND CORPORATION, Windsor Locks, CT (US)

(72) Inventors: David G. Hill, Rockford, IL (US); Michael Carbone, Rockford, IL (US)

(73) Assignee: HAMILTON SUNDSTRAND CORPORATION, Windsor Locks, CT (US)

(*) Notice: Subject to any disclaimer, the term of this patent is extended or adjusted under 35 U.S.C. 154(b) by 416 days.

(21) Appl. No.: 13/762,059

(22) Filed: Feb. 7, 2013

(65) Prior Publication Data

US 2014/0221145 A1 Aug. 7, 2014

(51) Int. Cl.
*F16H 57/04* (2010.01)

(52) U.S. Cl.
CPC ....... *F16H 57/043* (2013.01); *F16H 57/0483* (2013.01); *F16H 57/0464* (2013.01)

(58) Field of Classification Search
USPC ....................................... 475/160
See application file for complete search history.

(56) References Cited

U.S. PATENT DOCUMENTS

| 796,957 | A | * | 8/1905 | Coldwell et al. | 475/160 |
| 2,532,757 | A | * | 12/1950 | Butterworth | 475/23 |
| 4,317,386 | A | | 3/1982 | Shiuichiro et al. | |
| 7,686,728 | B2 | * | 3/2010 | Imbert | 475/160 |
| 2005/0049101 | A1 | * | 3/2005 | Kumashi et al. | 475/160 |

FOREIGN PATENT DOCUMENTS

| CN | 1041961 A | 5/1990 |
| JP | 58094672 A * | 6/1983 |

OTHER PUBLICATIONS

State Intellectual Property Office of People's Republic China; Application No. 201410044771.0; Date of Issue Sep. 18, 2016; 2 pages.

* cited by examiner

*Primary Examiner* — Timothy Hannon
(74) *Attorney, Agent, or Firm* — Cantor Colburn LLP

(57) ABSTRACT

A method and apparatus for lubricating a gear of a differential gear system is disclosed. A member or shaft rotates within a housing of the differential gear system. The shaft includes a chamber for receiving a lubricant from the exterior of the housing. A gear rotates relative to the shaft, and a hole in the shaft disperses the lubricant from the chamber to a selected gear location of the gear to lubricate the gear.

19 Claims, 4 Drawing Sheets

IN SITU GEARBOX GREASING SYSTEM

BACKGROUND

The present disclosure relates to gear lubrication and more specifically, to a method of lubricating a gear in a differential gear system without disassembly of a gearbox.

Differential gear systems include a plurality of gears that are in motion within a gear box. During operation, grease residing on the gears is squeezed out of the gears at the contacting mesh surfaces of the gears. Additionally, grease lubrication properties degrade over time. These gears therefore require periodic lubrication. When a gear system includes a fixed gear shaft, the gears may be easily re-greased by pumping grease from outside the gearbox into the gearbox via a tube or guide at a fixed location in a housing of the gearbox. However, differential gear systems, which have non-fixed rotating shafts, are not easily greased from the outside because the location requiring lubrication moves with respect to the housing and, thus, with respect to the fixed tube or guide. Another possible method of re-greasing a differential gear system involves disassembling the gearbox and gear assembly. This method however can be time consuming, expensive and open to the possibility of damaging or losing parts, incorrect reassembly or mis-rigging of the gearbox components to the overall system.

SUMMARY

According to one embodiment of the present disclosure, a differential gear system includes: a housing; a member configured to rotate within the housing; a chamber within the member configured to receive a lubricant from an exterior of the housing; a gear configured to rotate relative to the member; and a hole in the member configured to disperse the lubricant from the chamber to a selected gear location of the gear.

According to another embodiment, a method of lubricating a gear includes: supplying a lubricant to an interior of a shaft coupled to the gear; and dispersing the lubricant from the interior of the shaft to the gear through a hole in the shaft to lubricate the gear.

According to another embodiment, an apparatus for dispersing a lubricant in a differential gear system includes: a member coupled to a gear of the differential gear system, wherein the member is configured to rotate within a housing; a chamber within the member configured to receive the lubricant into the member from an exterior of the housing; and a tube coupled to a hole in the member configured to disperse the lubricant from the chamber to the gear.

Additional features and advantages are realized through the techniques of the present disclosure. Other embodiments and aspects of the disclosure are described in detail herein and are considered a part of the claimed disclosure. For a better understanding of the disclosure with the advantages and the features, refer to the description and to the drawings.

BRIEF DESCRIPTION OF THE SEVERAL VIEWS OF THE DRAWINGS

The subject matter which is regarded as the disclosure is particularly pointed out and distinctly claimed in the claims at the conclusion of the specification. The foregoing and other features, and advantages of the disclosure are apparent from the following detailed description taken in conjunction with the accompanying drawings in which:

DETAILED DESCRIPTION

Figure 1:
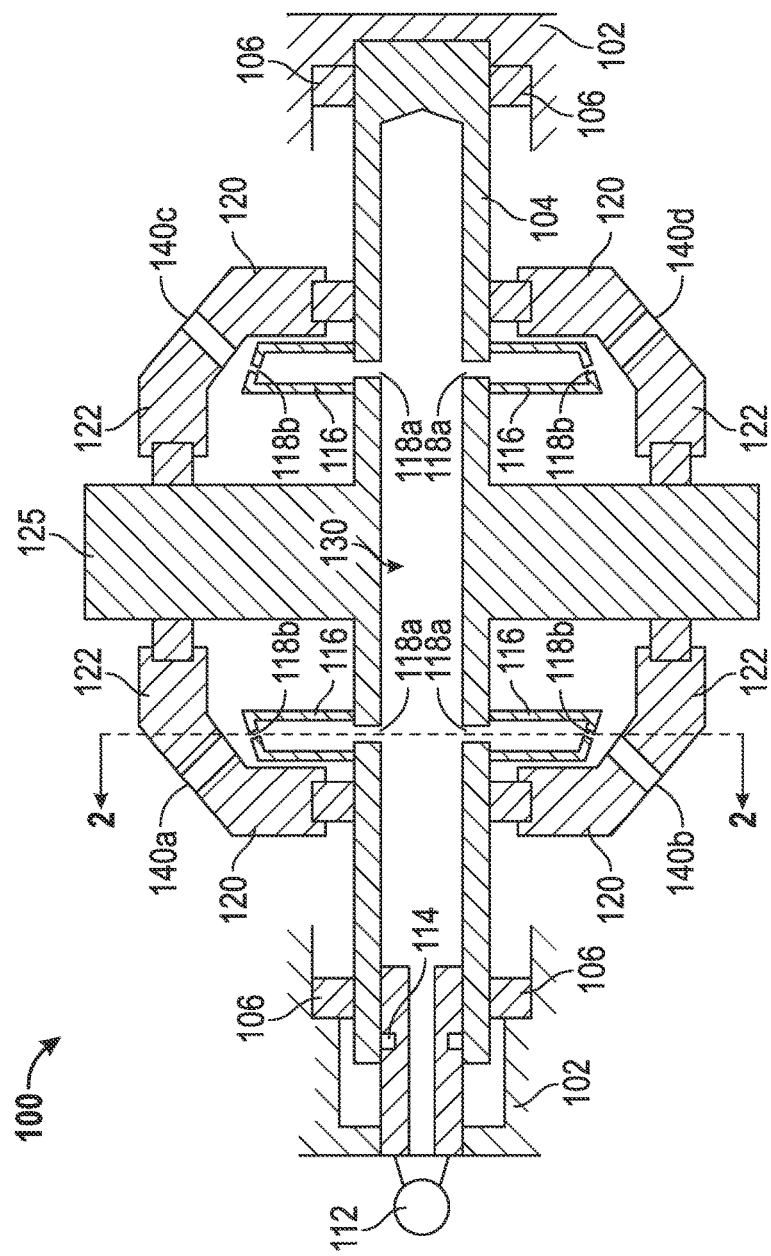
FIG. 1 shows a differential gear system in an exemplary embodiment of the invention.

FIG. 1 shows a differential gear system 100 in an exemplary embodiment of the invention. The exemplary differential gear system 100 includes housing 102 having a rotating shaft or member 104 contained therein. In an exemplary embodiment, the shaft 104 extends from a wall of the housing 102 at a first end of the shaft 104 to a wall of the housing 102 at a second end of the shaft 104. A set of bearings 106 may be coupled between the shaft 104 and the housing 102 enabling the shaft 104 to rotate along its axis. The shaft 104 may include a differential bearing shaft 125. The shaft 104 may further be coupled to or support at least one sun gear 120 of the differential gear system 100. The differential bearing shaft 125 may be coupled to or support at least one planetary gear 122. The teeth of the sun gears 120 may interact with the teeth of the planetary gears 122 at gear mesh locations 140a-d to allow relative motion of the sun gear 120 and planetary gear 122. In an exemplary embodiment, the sun gears 120 and planetary gears 122 are beveled gears that rotate in different planes. It is understood that the shaft 104 may be coupled to other gears not explicitly shown and that the methods disclosed herein may be applicable to lubricating these gears as well.

The shaft 104 includes a chamber or hollow section 130. A grease fitting 112 is coupled to the shaft 104 at one of the first end and the second of the shaft 104. In general, the grease fitting 112 may be a stationary part relative to the rotating shaft 104. A grease seal 114 may therefore be provided in the chamber 130 to maintain a seal between the stationary grease fitting 112 and the rotating shaft 104 to prevent leakage of the grease from the chamber 130 between shaft 104 and the grease fitting 112. A grease gun or other lubricant dispensing device may be coupled to the grease fitting 112 and then used to force grease, lubricant or other lubricant into the chamber 130 via the grease fitting 112 from a location exterior to the housing 102. The shaft 104 further comprises holes 118a at various axial locations along the shaft 104 for dispersing the grease, lubricant or fluid from the shaft 104. Any number of holes 118a may be provided at a given axial location. Grease travels from the grease fitting 112 along the chamber 130 of the shaft 104 to the holes 118a. The grease may then be forced radially outward from the shaft 104. In one embodiment, a radially outward force on the grease at holes 118a may be provided by the grease gun supplying the grease into the chamber 130 at the grease fitting 112. In another embodiment, the radially outward force on the grease at holes 118a may be provided by a centrifugal force resulting from rotation of the shaft 104. In an exemplary embodiment, a grease delivery device such as trough or gutter 116 may be coupled to an outside surface of the shaft 104 at holes 118a. Alternately, the grease delivery device may be a tube coupled to holes 118a. A cross-section of the exemplary trough or gutter 116 is discussed below with respect to FIG. 2 and is described further below. Grease exiting the holes 118a may be deposited into the trough or gutter 116 and forced out of the trough or gutter 116 via holes 118b. The trough or gutter 116 is configured to provide the holes 118b at a selected location such as the sun gear 120 or the planetary gear 122 or at a selected location of the gears, such as one of the gear mesh locations 140a-d. In various embodiments, the holes 118b maintain their alignment with the selected gears or selected gear locations during operation of the differential gear system 100. Rotation of the shaft 104 may further maintain the alignment of the holes 118b with the selected gear or selected gear location. During operation, grease is forced through holes 118b by a centrifugal force resulting from rotation of the trough or gutter 116 providing grease to the bevel gear mesh locations 140a-d.

Figure 2:
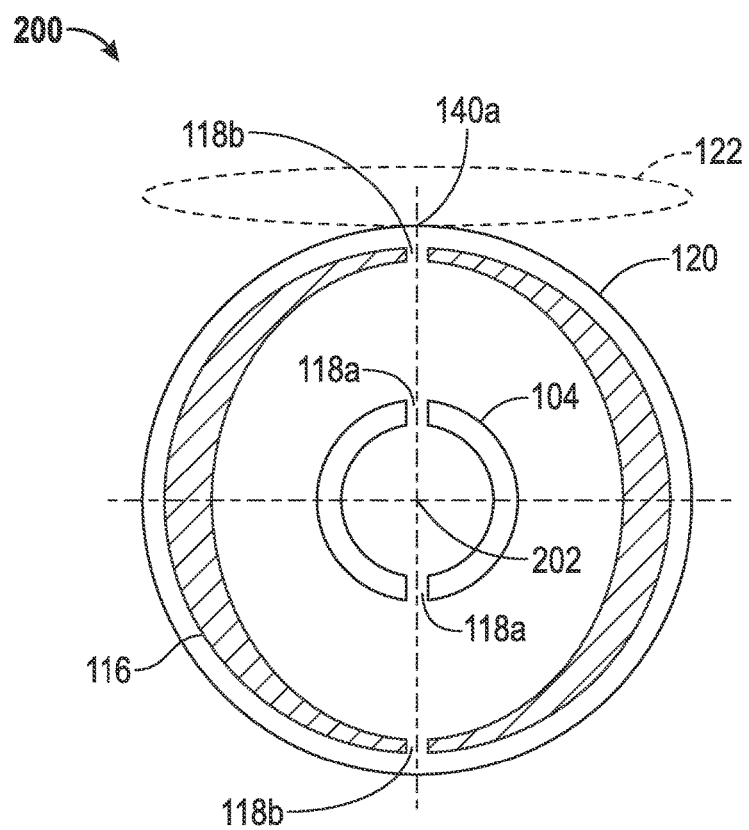
FIG. 2 shows a cross-section of an exemplary trough or gutter of the differential gear system of FIG. 1.

FIG. 2 shows a cross-section 200 of the exemplary trough or gutter 116 of the differential gear system 100. Shaft 104 is shown centered around rotational axis 202. The trough or gutter 116 surrounds the shaft 104. In an exemplary embodiment the trough or gutter 116 receives the grease as it exits the shaft 104 via hole 118a. Grease collects in the trough or gutter 116 and is distributed to the exemplary sun/planet gear mesh location 140a (shown only for illustrative purposes) when the gearbox is in operation. The grease trough 116 rotates with shaft 104 and the holes 118b are lined up with or to one side of the gear mesh location 140a. In various embodiments, the hole 118a in the tube 104 need not be aligned with the hole 118b in the trough 116. In one embodiment, the trough or gutter 116 may be non-circular in cross-section or an oval in cross-section with holes 118b being located along the major axis of the oval. The oval shape of the trough or gutter 116 allows grease to move towards the holes 118b in the trough or gutter 116 by centrifugal force during gearbox operation. Therefore, the oval design of the trough or gutter 116 may prevent accumulation of grease in the trough or gutter 116 and instead increase delivery of the grease from the trough or gutter 116 to the selected gear or selected gear location.

Figure 3:
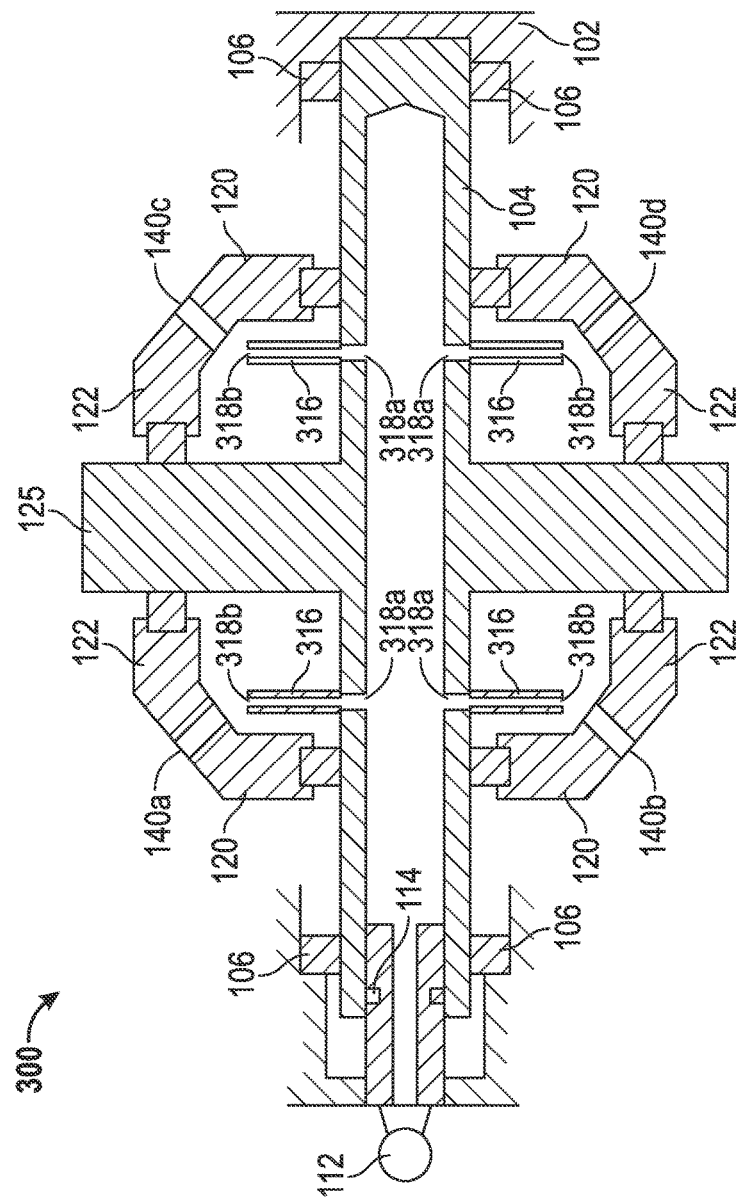
FIG. 3 shows a differential gear system in an alternate embodiment of the present invention.

FIG. 3 shows a differential gear system 300 in an alternate embodiment of the present invention. The function of the alternate differential gear system 300 is similar to the function of the differential gear system 100 of FIG. 1, except the trough or gutter 116 is replaced by a grease tube 316. Grease tubes 316 are couple to the shaft 104 to cover holes 318a. A selected grease tube 316 is oriented to receive lubricant flowing from an associated hole 318a at one end of the grease tube 316 and to distribute the lubricant from the grease tube 316 to a selected gear or selected gear part through hole 318b at the other end of the tube. The holes 318b are located on or near the sun/planet gear mesh locations 140a-d. The grease tube rotates with the shaft so that holes 118b are substantially always located at the gear mesh location a 140a-d or on one side of the gear mesh locations 140a-d. Each gear or gear part that is to be lubricated may have an associated tube 316. An operator may rotate the gears slowly to allow grease to be distributed to grease the planetary gears 122 and sun gear 120.

Figure 4:
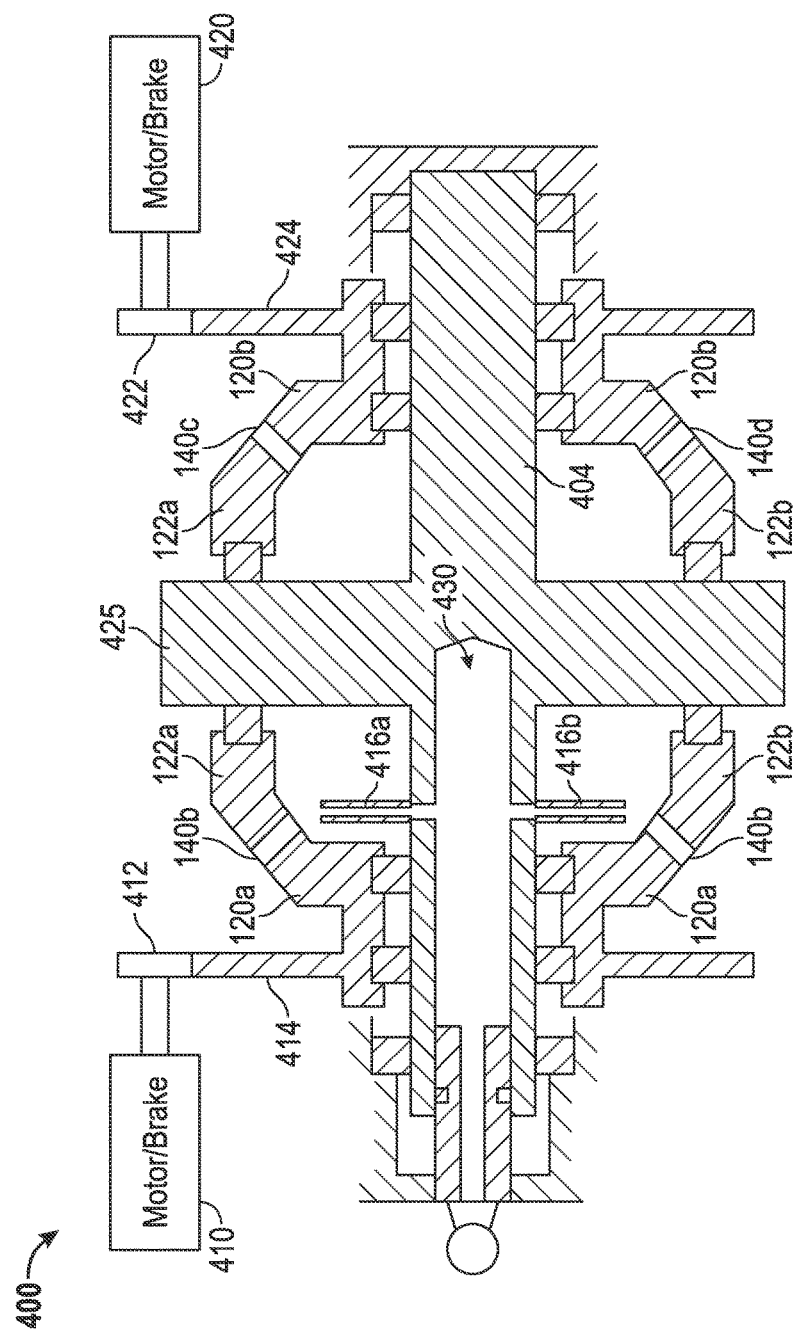
FIG. 4 shows another differential gear system in an alternate embodiment of the present invention.

FIG. 4 shows another differential gear system 400 in an alternate embodiment 400 of the present invention. For illustrative purposes, motor and brake systems 410 and 420 are shown for operation of the sun gears 120a and 120b of the differential gear system 400, respectively. Although shown with respect to differential gear system 400, such motor and brake system may also be used in differential gear systems 100 and 300 disclosed herein as well as other embodiment of differential gear systems. Motor and brake system 410 may be operated independently of motor and brake system 420, thereby causing independent motion of the sun gears 120a and 120b on opposite sides of the differential gear shaft 425. Motor and brake system 410 drives a rotation of a motor gear 412 which causes a rotation of a driver gear 414 that is coupled to the sun gear 120a. Similarly, motor and brake system 420 drives a rotation of a motor gear 422 that transfers the rotation to a driver gear 424 that is coupled to the sun gear 120b. When both motor and brake systems 410 and 420 are running at the same speed, the planetary gear 122a-b may not rotate around the differential bearing shaft 425. The planetary gears 122a-b may, however, orbit the hollow rotating shaft 104. When a motor of one motor and brake system is inoperable, the brake may be applied and the motor of the other motor and brake system provides rotational power to the differential through its respective sun gear. In this case, the planetary gears 122a-b may rotate around the differential bearing shaft 425 as well as orbit the hollow rotating shaft 404.

The alternate differential gear system 400 includes shaft 404 that includes a chamber 430 partially extending through the shaft 404. The chamber 430 extends only to the differential gear shaft 425. Only tubes 416a and 416b are therefore present. Tubes 416a and 416b distribute lubricant from the chamber 430 to selected gear mesh locations 140a and 140b, respectively. No tubes are present for distribution of lubricant to gear mesh locations 140c and 140d. The gears 120a-b and 122a-b may be rotated in order to distribute the lubricant to gear mesh locations 140c and 140d, either via rotation of the shaft 404 or by operation of one or more of the motor and brake systems 410 and 420. Therefore actuation of the gears may be used to transfer lubricant throughout the differential gear system. In alternate embodiments, one or more intermediate gears may be between gear mesh location 140a and 140c or between gear mesh locations 140b and 140d. These intermediate gears may therefore also be used to distribute the lubricant between location 140a and 140c and/or between location 140b and 140d.

In the exemplary embodiments shown in FIGS. 1-4, greasing of the gears may be performed in-situ without disassembly of the gearbox. The disclosed methods therefore reduce the maintenance time and cost associated with re-greasing a differential gear system. Since the re-greasing is performed without removing the gearbox, the chance of damage to the gearbox and surrounding equipment is reduced. Additionally, vehicle down time is reduced and the need to re-rig the differential gear system is reduced or eliminated.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated While the exemplary embodiment to the disclosure has been described, it will be understood that those skilled in the art, both now and in the future, may make various improvements and enhancements which fall within the scope of the claims which follow. These claims should be construed to maintain the proper protection for the disclosure first described.

What is claimed is:

1. A differential gear system, comprising:
   a housing;
   a member configured to rotate within the housing, the member including a differential bearing shaft;
   a chamber within the member configured to house a lubricant;
   a first gear supported by the member and configured to rotate relative to the member;
   a second gear supported by the differential bearing shaft and configured to rotate relative to the differential bearing shaft, wherein the first gear interacts with the second gear at a gear mesh location outside the member; and
   a grease delivery device on the member configured to disperse the lubricant from the chamber to the gear mesh location, the grease delivery device including:
      an annular trough sharing a common central axis with the member and disposed radially outboard of the member, the annular trough configured to receive the lubricant from the chamber; and
      one or more openings in the annular trough configured to disperse the lubricant to the gear mesh location.

2. The differential gear system of claim 1, wherein the grease delivery device is configured to maintain an alignment with the selected gear mesh location during rotation of the member.

3. The differential gear system of claim 1 wherein the grease delivery device is configured to convey the lubricant from a hole in the member to the selected gear mesh location.

4. The differential gear system of claim 1, further comprising a motor configured to cause a rotation of the first and second gear that transfers the lubricant from the first gear to the second gear.

5. The differential gear system of claim 4 further comprising a third gear configured to transfer the lubricant from the first gear to the second gear during the rotation.

6. The differential gear system of claim 1, wherein the lubricant is dispersed from the chamber using one of: a force provided by a device supplying the lubricant to the interior of the member; and a centrifugal force.

7. A method of lubrication within a gearbox, comprising:
   disposing a rotating shaft within the gearbox that supports a first gear and includes a differential bearing shaft that supports a second gear, wherein the first gear interacts with the second gear at a gear mesh location outside of the shaft;
   housing a lubricant in an interior of the rotating shaft; and
   dispersing the lubricant from the interior of the rotating shaft to the gear mesh location through a grease delivery device on the rotating shaft, the grease delivery device including:
      an annular trough sharing a common central axis with the rotating shaft and disposed radially outboard of the rotating shaft, the annular trough configured to receive the lubricant from the chamber; and
      one or more openings in the annular trough configured to disperse the lubricant to the gear mesh location.

8. The method of claim 7, wherein the grease delivery device maintains an alignment with the gear mesh location during rotation of the shaft.

9. The method of claim 7, wherein the grease delivery device receives grease from the shaft via a hole in the shaft.

10. The method of claim 7 wherein the grease delivery device has a non-circular or oval cross-section.

11. The method of claim 7, further comprising dispersing the lubricant to the second gear by dispersing the lubricant to the first gear and rotating the first and second gear to transfer the lubricant from the first gear to the second gear.

12. The method of claim 11 further comprising transferring the lubricant from the first gear to the second gear via a third gear.

13. The method of claim 7, further comprising dispersing the lubricant from the interior of the shaft using one of: a force provided by a device supplying the lubricant to the interior of the shaft; and a centrifugal force.

14. An apparatus for dispersing a lubricant in a differential gear system, comprising:
   a member configured to rotate within a housing of the differential gear system;
   a chamber within the member configured to house the lubricant;
   a first gear supported by the member;
   a differential bearing shaft supported by the member;
   a second gear supported by the differential bearing shaft that interacts with the first gear at a gear mesh location outside of the member; and
   a grease delivery device coupled to a hole in the member configured to disperse the lubricant from the chamber to the gear mesh location, the grease delivery device including:
      an annular trough sharing a common central axis with the member and disposed radially outboard of the member, the annular trough configured to receive the lubricant from the chamber; and
      one or more openings in the annular trough configured to disperse the lubricant to the gear mesh location.

15. The apparatus of claim 14, wherein the grease delivery device is configured to rotate to maintain an alignment with the gear mesh location during rotation of the member.

16. The apparatus of claim 14, further comprising a motor configured to rotate the first and second gear to transfer the lubricant from the first gear to the second gear.

17. The apparatus of claim 16 further comprising a third gear configured to transfer the lubricant from the first gear to the second gear during the rotation.

18. The apparatus of claim 14, wherein the lubricant is dispersed from the interior of the member using one of: a force provided by a device supplying the lubricant to the interior of the member; and a centrifugal force.

19. The apparatus of claim 14, wherein the lubricant is at least one of a lubricant and grease.

* * * * *